United States Patent [19]

Casagrande et al.

[11] Patent Number: 5,235,025

[45] Date of Patent: Aug. 10, 1993

[54] CROSS-LINKABLE THERMOTROPIC LIQUID CRYSTALLINE AROMATIC POLYESTER

[75] Inventors: Francesco Casagrande; Marco Foá, both of Novara; Carlo Federici, Milan; L. Lawrence Chapoy, Lesa, all of Italy

[73] Assignee: Himont Italia S.r.l., Milan, Italy

[21] Appl. No.: 881,036

[22] Filed: May 11, 1992

Related U.S. Application Data

[63] Continuation of Ser. No. 804,638, Dec. 10, 1991, abandoned, which is a continuation of Ser. No. 478,489, Feb. 12, 1990, abandoned.

[30] Foreign Application Priority Data

Feb. 14, 1989 [IT] Italy .................... 19434 A/89

[51] Int. Cl.$^5$ .................... C08G 63/00; C08G 63/18; C08G 67/00; C08G 69/00
[52] U.S. Cl. .................... 528/192; 528/176; 528/190; 528/193; 528/271; 528/272
[58] Field of Search .................... 528/176, 192, 190, 193, 528/271, 272

[56] References Cited

U.S. PATENT DOCUMENTS 3,555,117  1/1971  Stahly et al. .................... 525/11
4,626,584  12/1986  Stackman et al. .................... 528/192

FOREIGN PATENT DOCUMENTS 554222  2/1957  Belgium .
159982  1/1964  U.S.S.R. .
0755826  8/1980  U.S.S.R. .

OTHER PUBLICATIONS

Macromol. Chem., "Structural Variations of Liquid--Crystalline Polymers ..." Sibylle Berg et al., vol. (7) pp. 381–388 (1986).
Polymer Science USSR, vol. 7, No. 11, (1965), pp. 2067–2072, Pergamon Press, GB; S. V. Vinogradova et al.
Polymer Science USSR, vol. 7, No. 11, (1965), pp. 2072–2076, Pergamon Press, GB; S. V. Vinogradova et al.
Chemical Abstracts, vol. 60, No. 10, (1964), p. 60 Abstract No. 12135h, V. V. Korshak et al.

Primary Examiner—John Kight, III
Assistant Examiner—T. Mosley
Attorney, Agent, or Firm—Stevens, Davis, Miller & Mosher

[57] ABSTRACT

Cross-linkable thermotropic liquid crystalline aromatic polyesters comprising at least one unit derived from an aromatic diol substituted with at least one allyl group, in combination with units derived from dioxyaryl and dicarboxyaryl monomers.

9 Claims, No Drawings

CROSS-LINKABLE THERMOTROPIC LIQUID CRYSTALLINE AROMATIC POLYESTER

This application is a Continuation of U.S. application Ser. No. 07,804,638 filed Dec. 10, 1991, which in turn is a Continuation of U.S. application Ser. No. 07/478,489, filed Feb. 12, 1990, both abandoned.

The present invention relates to thermotropic liquid crystalline aromatic polyesters.

More particularly the present invention relates to thermotropic liquid crystalline aromatic polyesters, having a mesogen group in the main chain.

Still more particularly the present invention relates to thermotropic liquid crystalline aromatic polyesters, having a rigid structure, which polymers can be processed easily in the melted state and are characterized by the presence in the main chain, of a constituent containing a group capable of cross-linking by thermic treatment.

The cross-linking technique has been studied widely in the case of conventional thermoplastic polymers, including polyesters such as PET and PBT as well.

On the contrary, the examples reported for the cross-linking of thermotropic liquid crystalline polymers are not many.

In particular in U.S. Pat. No. 4,440,945 the use is disclosed of monomers capable of yielding an anisotropic melt, having acetylenic end groups, which can be cross-linked, whereas in U.S. Pat. No. 4,452,993 monomers of the same type are disclosed, having however the cross-linkable end group derived from acrylic acid.

Polymer which can be obtained from monomers of this kind, have however the drawback to have a low molecular weight and low melting temperature, therefore they are unstable to heat.

In U.S. Pat. No. 4,654,412 cross-linkable thermotropic polyesters are disclosed, which can be obtained from monomers derived from functionalized tolans or stilbenes.

In this case the cross-linking takes place by action, on formed articles, of a monomer containing electron attractor groups such as maleic acid or anhydride.

This technique, however, is not quite satisfactory as the cross-linking concerns more the outer layers of the articles rather than their inner part.

In U.S. Pat. No. 4,626,584 the formation is disclosed of hot cross-linkable polyesters starting from a mixture of monomers containing p-hydroxy benzoic acid substituted with an allyl group in the aromatic ring.

These polymers require, however, very long times, tens of hours, to be able to cross-link thermally, for instance after having been spun as fibres.

The Applicant has now found that, the drawbacks of the Prior Art can be overcome and thermotropic liquid crystalline polyesters can be obtained, which can be hot cross-linked easily, at a temperature below the processing temperature of the melt if hydroquinones substituted with allyl groups are used as monomers supporting the group which can be cross-linked.

Therefore the object of the present invention consists in cross-linkable thermotropic liquid crystalline aromatic polyesters containing in the chain at least one unit derived from allyl substituted aromatic diols having general formula:

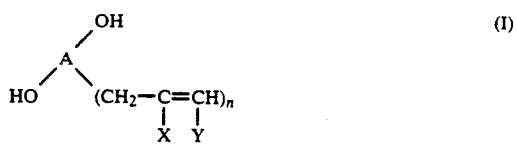

wherein A represents a simple, double or condensed aromatic radical, in which the two hydroxyl groups are in para position or, anyhow, in such a position as to form the polymeric chain with substantially coaxial or parallel direction, and wherein X and Y, which may be the same or different, represent respectively a hydrogen atom or a $C_1-C_4$ alkyl radical or a cycloalkyl, aryl, or arylalkyl radical containing from 6 to 20 carbon atoms and n is a whole number selected from 1 and 2.

More particularly the object of the present invention consists in cross-linkable thermotropic liquid crystalline aromatic polyesters comprising:
a) at least one unit derived from allyl substituted aromatic diols having general formula (I);
b) at least one unit derived from aromatic diols having general formula:

wherein $R_1$ represents a cycloalkyl, a simple, double or condensed aryl radical containing from 6 to 18 carbon atoms, optionally substituted with at least one halogen or with at least one radical selected from alkyl radicals containing from 1 to 6 carbon atoms, cycloalkyl radicals containing from 6 to 18 carbon atoms, aryl radicals containing from 6 to 18 carbon atoms and arylalkyl radicals containing at least 7 carbon atoms, preferably from 7 to 15;
c) at least one unit derived from bicarboxylic acids having general formula:

wherein $R_2$ is equal to or different from $R_1$ and has the same meaning as $R_1$;
d) optionally at least one unit derived from hydroxyacids having general formula:

wherein $R_3$ is equal to or different from $R_2$ and has the same meaning as $R_2$, whereas m is equal to zero or to 1.

According to a preferred embodiment of the polyesters object of the present invention, at least 90% by moles of the products having general formula (II), (III) and (IV) has the two functional groups, which are such as to form the polymeric chain with substantially coaxial or parallel direction.

Examples of allyl substituted aromatic diols which can be used advantageously for the preparation of present polyesters are: 2-allylhydroquinone, 2-metallylhydroquinone, 2,5-diallylhydroquinone, which can be alone or in mixture with 2,3-diallylhydroquinone, 3,3'-diallyl-4,4'-dihydroxydiphenyl, and the like.

Examples of aromatic diols having general formula (II) are: hydroquinone, methyl, ethyl, propyl, t-butyl hydroquinone, phenyl hydroquinone, (1-phenylethyl)-hydroquinone, 2,5-bis(phenylethyl)hydroquinone, 2-(alpha-phenylisopropyl)hydroquinone, 2,5-bis(alpha-phenylisopropyl)hydroquinone, cyclohexylhydroquinone, chloro-phenyl hydroquinone, chloro-t-butyl hydroquinone, 4,4'-dihydroxydiphenyl, 2,6-dihydroxynaphthalene, chloro, bromo 4,4'-dihydroxydiphenyl, methyl, ethyl, propyl, butyl 4,4'-dihydroxydiphenyl, t-butyl-4,4'-dihydroxydiphenyl, cyclohexyl-4,4'-dihydroxydiphenyl, phenylethyl-4,4'-dihydroxydiphenyl, (1-methyl-1-phenylethyl)-4,4'-dihydroxydiphenyl, naphthyl-4,4'-dihydroxydiphenyl, acetyl-4,4'-dihydroxydiphenyl, propionyl-4,4'-dihydroxydiphenyl, benzoyl-4,4'-dihydroxydiphenyl, methoxy-4,4'-dihydroxydiphenyl, phenoxy-4,4'-dihydroxydiphenyl, 3,3'-dichloro-4,4'-dihydroxydiphenyl, 3,3'-dibromo-4,4'-dihydroxydiphenyl, 3,3'-diphenylethyl-4,4'-dihydroxydiphenyl, 3,3'-dimethyl-4,4'-dihydroxydiphenyl, 3,3'-diethyl-4,4'-dihydroxydiphenyl, 3,3'-di-t-butyl-4,4'-dihydroxydiphenyl, 3,3'-dicyclohexyl-4,4'-dihydroxydiphenyl, 3,3'-di(1-methyl-1-phenylethyl)-4,4'-dihydroxydiphenyl, 3,3'-diphenyl-4,4'-dihydroxydiphenyl and the like.

Examples of bicarboxylic aromatic acids are: terephthalic acid, chloro, bromo-therephthalic acid, methyl-therephthalic acid, 1,4-naphthalenedicarboxylic, 1,5-naphthalenedicarboxylic and 2,6-naphthalenedicarboxylic acids, 4,4'-diphenyldicarboxylic acid, 3,3'-dibromo-4,4'-diphenyldicarboxylic acid, 4,4'-stilbenedicarboxylic acid and the like.

Examples of hydroxyacids are: p-hydroxybenzoic acid, 3-chloro-4-hydroxybenzoic acid, 3-bromo-4-hydroxybenzoic acid, 3,5-dichloro-4-hydroxybenzoic acid, 3-methyl-4-hydroxybenzoic acid, 3-t-butyl-4-hydroxybenzoic acid, 4-hydroxy-1-naphthoic acid, 6-hydroxy-2-naphthoic acid, p-(4-hydroxyphenyl)benzoic acid, p-hydroxycinnamic acid and the like.

According to a further preferred embodiment of the polyesters object of the present invention the units derived from the allyl substituted diols according to item (a) are present in amounts ranging from 2.5 to 25% by moles with respect to the total units derived from the aromatic diols, whereas the units derived from the hydroxyacids according to item (d) are in d/c molar ratios, with the units derived from the diacids according to item (c), ranging from 0 to 4, preferably from 0.1 to 2.

The polymers object of the present invention, are optically anisotropic in the melted state, as it can be checked by analysis by optic microscopy with polarized light and have an inherent viscosity, measured in an 1/1 phenol and 1,2,4 trichlorobenzene mixture at 30° C. at a concentration of 0.25 g/dl, ranging from 0.3 to 4 dl/g.

The preparation of the liquid crystalline aromatic polyesters object of the present invention, can be carried out according to customary techniques, by making the above mentioned monomers, which are available on the market or can be prepared easily according to the customary techniques of organic chemistry, to react under the usual conditions of preparation of the polyester resins.

For instance said polyesters can be obtained in the melted state or in the presence of a dispersing medium, having a high boiling point, such as diphenylsulfone or mixtures of partly hydrogenated terphenyls, by transesterification between the bicarboxylic aromatic acids and acetates or propionates of phenols, and optionally of hydroacids, at temperatures ranging from 270° to 330° C., in order to facilitate the complete evolution of the aliphatic carboxylic acids even by operating under vacuum.

Optionally the reaction can be carried out in the presence of a catalyst of transesterification, such as, for instance, phosphates or acetates of alkaline or alkaline-earth metals.

The required amount of catalyst is between 0.005 and 1% molar and preferably between 0.01 and 0.2%, calculated on the total amount of the reagents.

According to an alternative method, the liquid crystalline aromatic polyesters, object of the present invention, can be obtained in solution, by polycondensation between the halogenides of the bicarboxylic aromatic acids and the mixture of phenols in a suitable solvent. The temperature ranges from 25° to 220° C. and the reaction is carried out, in the presence of a base and/or of a nitrogen flow in order to facilitate the elimination of the halogenidric acid.

Pyridine is preferred among the bases, whereas both aliphatic and aromatic chlorinated solvents, such as methylene chloride, chlorobenzene, dichloro benzenes and trichlorobenzenes are particularly preferred among the solvents.

Then the thus obtained polymer is recovered by evaporation of the solvent or by precipitation by means of a non-solvent and subsequent filtration, washing and drying.

The polyesters, object of the present invention, are suitable for being used for obtaining formed bodies, which can be prepared according to the customary technologies of transformation of thermoplastic polymers, such as, for instance, injection molding or extrusion, can be processed in the form of film or fibre, can be used as matrixes for composite materials based on fibres or inorganic fillers and can be used in mixture with other polymers.

The cross-linking reaction takes place after the formation phase and comprises the following modalities. An article is prepared in the desired shape and heated at a temperature, which is sufficient to cross-link the allyl groups of the monomer having general formula (I) and to keep the shape of solid article obtained after the molding operation.

As the polyesters object of the present invention, have generally a melting temperature ranging from 270° and 350° C., the cross-linking temperature is fixed at values, which are very little below the melting temperature, for instance of about 5°-15° C.

The cross-linking is carried out preferably in the presence of an inert gas, for instance nitrogen and for times ranging from 2 to 12 hours.

At the end of the cross-linking reaction the polymer is not more soluble in the solvent, for instance 1/1 phenol and 1,2,4-trichlorobenzene mixture, even at high temperatures and it does not crystallize again if it is brought to the melted state.

A few illustrative, but not limitative, examples will be reported hereinafter, in order to better understand the present invention and to practice it.

EXAMPLE 1

3.96 g (21.3 mM) of phenylhydroquinone, 3.19 g (14.9 mM) of (1-phenylethyl)hydroquinone, 0.96 g (6.4 mM) of allylhydroquinone (15% by moles on the whole of the diols), 8.63 g (42.6 mM) of terephthalic acid dichloride and 170 ml of 1,2,4-trichlorobenzene were loaded into a 4 neck glass flask having a capacity of 250 ml, equipped with mechanical stirrer, cooler and inlet pipe for nitrogen.

The whole was kept under stirring and a nitrogen flow for 30 minutes at room temperature, afterwards it was brought to reflux temperature (about 210° C.) by means of a silicone oil bath.

The mixture was kept at this temperature for 9 hours, till the HCl generation had practically stopped. At the end of the polymerization, always under nitrogen flow and stirring, the oil bath was removed and the mixture was let cool; when the reaction mixture reached 50° C., the formed gelatinous mass was poured into acetone and the precipitate was filtered.

The thus obtained polymer was washed with acetone (twice), hot water (twice) and acetone/methanol (twice).

The final product was dried for 5 hours at 180° C. 12.88 g of polymer were obtained with a yield of 94.4% on the theoretic value.

The dried polymer was ground, washed with boiling acetone for 8 hours in a Kumagawa extractor, afterwards it was dried at 180° C. for further 5 hours.

The polymer had a melting temperature (Tm) of about 315° C. and an inherent viscosity of 2.40 dl/g (measured at the temperature of 30° C. in a solvent consisting of equal volumes of phenol and 1,2,4-trichlorobenzene at the concentration of 2.5 g/liter).

The melted polymer was optically anisotropic at a microscope with polarized light.

The melting temperature was determined at DSC (Differential Scanning Calorimetry) with a scanning of 20° C./minute.

The polymer, which proved to be processable in the melted state, was used for preparing extruded test bars, by processing at 330° C. for a stay time at this temperature of about 3 minutes. At the same time tests of thermomolding were carried out by operating on laminates of 50×50×1 mm, at a compression of about 50 Kg/cm$^2$ and at a temperature over 300° C. In all the cases no particular problems were noticed concerning both fluidity and degradation.

The polymer as such, in the form of powder, the extruded and thermo-molded product were heated at 300° C. for 8 hours under a nitrogen flow in order to obtain the cross-linking. The thus treated samples proved to be insoluble at the temperature of 180° C. in a solvent consisting of equal volumes of phenol and 1,2,4-trichlorobenzene.

EXAMPLE 2

Comparative example

One worked as described in example 1, but in absence of allylhydroquinone.

A polymer was obtained, having a melting temperature (Tm) of about 338° C. determined at D.S.C. and an inherent viscosity of 2.54 dl/g, measured as described in example 1. A part of this polymer was heated at 300° C. for 8 hours under a nitrogen flow. The thus treated polymer proved to be soluble in the same solvent used in example 1.

EXAMPLE 3

One worked as described in example 1, but using 0.65 g (4.3 mM) of allylhydroquinone (10% by moles on the whole of the diols). A polymer was obtained having a melting temperature (Tm) of about 323° C. measured at DSC and an inherent viscosity of 3.28 dl/g measured as described in example 1. Extruded products were obtained by operating as described in example 1.

The polymer as such, in the form of powder, and the extruded product were heated for 8 hours at 300° C. under a nitrogen flow. The thus treated samples proved to be insoluble at the temperature of 180° C. in the same solvent of example 1.

EXAMPLE 4

7.76 g (25.5 mM) of (1-methyl-1-phenylethyl)-4,4' dihydroxydiphenyl, 0.68 g (4.5 mM) of allylhydroquinone (15% by moles on the whole of the diols), 6.09 g (30 mM) of terephthalic acid dichloride and 145 ml of 1,2,4-trichlorobenzene were loaded into the same apparatus of example 1 and under the same conditions.

One went on as described in example 1, by keeping the reaction mixture under reflux (about 210° C.) for 15 hours.

One obtained 11.67 g of a dry polymer (yield of 94.57% on the theoretical value) which was further washed in a Kumagawa extractor as described in example 1. The thus obtained polymer had an inherent viscosity of 2.73 dl/g measured as described in example 1.

The melted polymer was optically anisotropic at a microscope with polarized light.

A part of the polymer as such, in the form of powder, was heated to 300° C. for 8 hours under a nitrogen flow. The thus treated polymer proved to be insoluble at the temperature of 180° C. in the solvent used in example 1.

EXAMPLE 5

3.55 g (19.06 mM) of phenylhydroquinone, 3.47 g (16.20 mM) of (1-phenylethyl)hydroquinone, 0.54 g (2.86 mM) of dialkylhydroquinone (2,5-diallylhydroquinone: 95%, 2,3-diallylhydroquinone: 5%) (7.5% on the whole of the diols), 7.74 g (38.13 mM) of terephthalic acid dichloride and 150 ml of 1,2,4-trichlorobenzene were loaded into the same apparatus of example 1.

One went on as described in example 1, by keeping the reaction mixture under reflux (about 210° C.) for 11.5 hours. One obtained 12.17 g of a dry polymer (yield of 97.1% on the theoretical value), which was further washed as described in Example 1.

The thus obtained polymer had a melting temperature (Tm) of about 310° C. measured at DSC and an inherent viscosity of 1.16 dl/g measured as described in example 1.

The melted polymer was optically anisotropic at a microscope with polarized light.

A part of the polymer as such, in the form of powder, was heated to 300° C. for 8 hours under a nitrogen flow. The thus treated polymer proved to be insoluble up to the temperature of 180° C. in the solvent used in example 1.

We claim:

1. A cross-linkable thermotropic liquid crystalline aromatic polyester containing in the chain:
   a. at least one unit derived from an allyl substituted aromatic diol having the formula

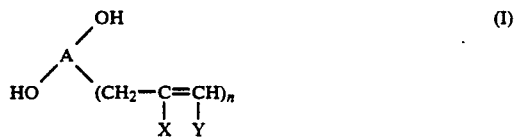

(I)

wherein A represents a single-ring, double-ring, or condensed-ring aromatic radical, in which the two hydroxy groups are in para position or in a position to form a polymeric chain with substantially coaxial or parallel direction and wherein X and Y, the same or different, represent respectively a hydrogen atom or a $C_1$–$C_4$ alkyl radical or a cycloalkyl, aryl or arylalkyl radical containing from 6 to 20 carbon atoms, and n is 1 or 2;

b. at least one unit derived from an aromatic diol having the formula:

$$HO-R_1-OH \qquad (II)$$

wherein $R_1$ represents a single-ring, double-ring or condensed-ring aryl radical containing from 6 to 18 carbon atoms, optionally substituted with at least one halogen atom or with at least one radical selected from alkyl radicals containing from 1 to 6 carbon atoms, cycloalkyl radicals containing from 6 to 18 carbon atoms, aryl radicals containing from 6 to 18 carbon atoms or arylalkyl radicals containing at least 7 carbon atoms;

c. at least one unit derived from a bicarboxylic acid having the formula:

$$HOOC-R_2-COOH \qquad (III)$$

wherein $R_2$ is equal to or different from $R_1$ and has the same meaning as $R_1$; and d. optionally at least one unit derived from a hydroxy acid having the formula:

$$HO-R_3-(CH=CH)_m-COOH \qquad (IV)$$

wherein $R_3$ is equal to or different from $R_2$ and has the same meaning as $R_2$ and m is zero or 1.

2. Polyester according to claim 1 wherein the units derived from the allyl substituted diol according to a.-d. are present in amounts ranging from 2.5 to 25% by moles with respect to the total units derived from the aromatic diol, whereas the units derived from the hydroxy acid according to d. and in d/c molar ratios, with the units derived from the diacid according to c., ranging from zero to 4.

3. Polyester according to claim 1, wherein the allyl substituted aromatic diol is 2-allylhydroquinone, 2-methallylhydroquinone, 2,5-diallylhydroquinone, alone or in mixture with 2,3-diallylhydroquinone, or 3,3'-diallyl-4,4'-dihydroxydiphenyl.

4. Polyester according to claim 1, wherein the aromatic diol of the formula (II) is hydroquinone, methyl, ethyl, propyl, t-butyl hydroquinone, phenylhydroquinone, (1-phenylethyl)hydroquinone, 2,5-bis(phenylethyl)hydroquinone, 2-(alpha-phenylisopropyl)hydroquinone, 2,5-bis(alpha-phenylisopropyl)hydroquinone, cyclohexylhydroquinone, chlorophenylhydroquinone, chloro-t-butyl hydroquinone, 4,4'-dihydroxydiphenyl, 2,6-dihydroxynaphthalene, chloro, bromo 4,4'-dihydroxydiphenyl, methyl, ethyl, propyl, butyl 4,4'-dihydroxydiphenyl, t-butyl-4,4'-dihydroxydiphenyl, cyclohexyl-4,4'-dihydroxydiphenyl, phenylethyl-4,4'-dihydroxydiphenyl, (1-methyl-1-phenylethyl)-4,4'-dihydroxydiphenyl, naphthyl-4,4'-dihydroxydiphenyl, acetyl-4,4'-dihydroxydiphenyl, propionyl-4,4'-dihydroxydiphenyl, benzoyl-4,4'-dihydroxydiphenyl, methoxy-4,4'-dihydroxydiphenyl, phenoxy-4,4'-dihydroxydiphenyl, 3,3'-dichloro-4,4'-dihydroxydiphenyl, 3,3'-dibromo-4,4'-dihydroxydiphenyl, 3,3'-diphenylethyl-4,4'-dihydroxydiphenyl, 3,3'-dimethyl-4,4'-dihydroxydiphenyl, 3,3'-diethyl-4,4'-dihydroxydiphenyl, 3,3'-di-t-butyl-4,4'-dihydroxydiphenyl, 3,3'-dicyclohexyl-4,4'-dihydroxydiphenyl, 3,3'-di(1-methyl-1-phenylethyl)-4,4'-dihydroxydiphenyl, or 3,3'-diphenyl-4,4'-dihydroxydiphenyl.

5. Polyester according to claim 1, wherein the bicarboxylic aromatic acid of the formula (III) is terephthalic acid, chloro, bromo-terephthalic acid, methylterephthalic acid, 1,4-naphthalenedicarboxylic, 1,5-naphthalenedicarboxylic or 2,6-naphthalenedicarboxylic acid, 4,4'-diphenyldicarboxylic acid, 3,3'-dibromo-4,4'-diphenyldicarboxylic acid or 4,4'-stilbenedicarboxylic acid.

6. Polyester according to claim 1, wherein the hydroxyacid of formula (IV) is p-hydroxybenzoic acid, 3-chloro-4-hydroxybenzoic acid, 3-bromo-4-hydroxybenzoic acid, 3,5-dichloro-4-hydroxybenzoic acid, 3-methyl-4-hydroxybenzoic acid, 3-t-butyl-4-hydroxybenzoic acid, 4-hydroxy-1-naphthoic acid, 6-hydroxy-2-naphthoic acid, p-(4-hydroxyphenyl) benzoic acid, or p-hydroxycinnamic acid.

7. Polyester according to claim 1, having an inherent viscosity, measured in a 1/1 phenol and 1,2,4-trichlorobenzene mixture at 30° C. at a concentration of 0.25 g/dl, ranging from 0.3 to 4 dl/g and a melting temperature ranging from 270° to 350° C.

8. A method for obtaining fibers, films, bodies formed by injection or extrusion or matrices for composite materials containing fibers or inorganic fillers, comprising shaping a polyester as defined in claim 1 into the form of said fibers, films, bodies formed by injection or extrusion or matrices for composite materials containing fibers or inorganic fillers.

9. Polyester according to claim 1 wherein at least 90% moles of the polyester product are derived from compounds having formula (II), (III) or (IV) wherein the two terminal functional groups thereof are such as to form a polymeric chain with substantially coaxial or parallel direction.

* * * * *